June 9, 1953 W. VREELAND 2,641,048
CUTTING TOOL

Filed April 14, 1951 2 Sheets-Sheet 1

INVENTOR.
WHITNEY VREELAND
BY
F.R.Geisler.
ATTORNEY

June 9, 1953 W. VREELAND 2,641,048
CUTTING TOOL
Filed April 14, 1951 2 Sheets-Sheet 2
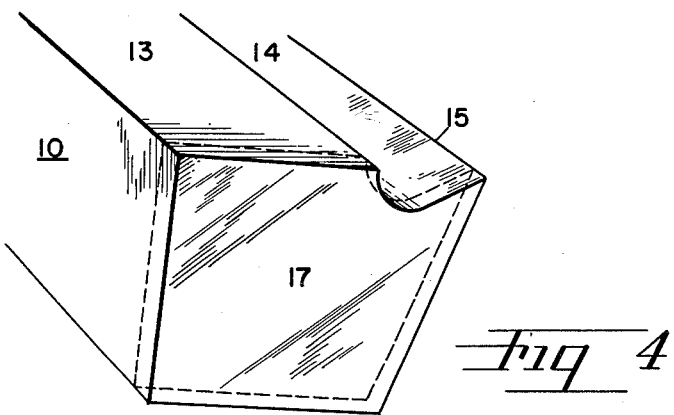
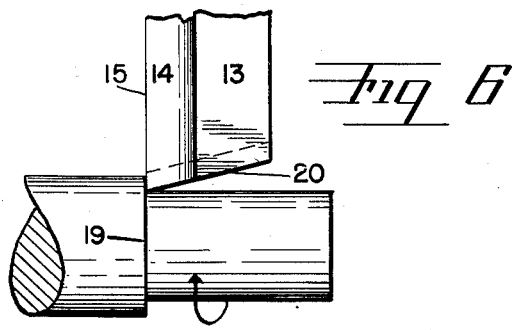
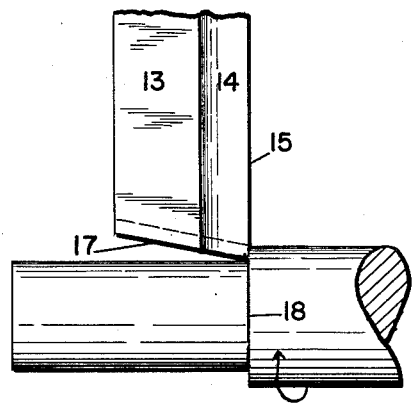
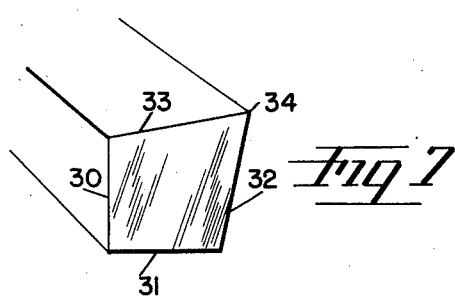
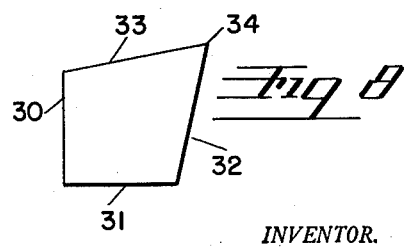
INVENTOR.
WHITNEY VREELAND
BY
ATTORNEY Patented June 9, 1953

2,641,048

UNITED STATES PATENT OFFICE 2,641,048

CUTTING TOOL

Whitney Vreeland, Portland, Oreg.

Application April 14, 1951, Serial No. 221,067

2 Claims. (Cl. 29—95)

This invention relates in general to cutting tools of the type used in lathes, shapers, and similar machines, and, more specifically, relates to the blanks which are ground or sharpened to form such cutting tools.

An object of the invention is to provide an improved bit or tool blank which will require a minimum amount of grinding for producing a desired bit or tool.

One of the problems in the proper maintenance of such cutting tools is the sharpening of the cutting edge, which sharpening is required from time to time. Heretofore such sharpening has necessitated the grinding of several surfaces or faces of the blank from which the cutting tool is formed, and special care has been required in keeping these faces in the correct position of angularity with respect to each other in the grinding. Consequently the sharpening of such tools has called for considerable skill and care on the part of the one performing the work.

Another object of this invention is to provide a cutting tool made from a blank of such formation that the tool can quickly and easily be resharpened even by an unskilled operator.

As a general rule, the tool-forming portion of a tool blank heretofore has been limited to a relatively small end section of the blank, with the result that after a few sharpenings of the tool the blank must be discarded.

A related object of the present invention is to provide an improved prefabricated tool blank, the major portion of which can be used to provide a desired cutting tool, thus enabling the resulting tool to be resharpened many times before the blank is ready to be discarded.

Another object is to provide an improved prefabricated tool blank, both ends of which may be utilized as the cutting tool and thus both ends resharpened or reground a number of times.

A similar object of the invention is to provide an improved tool blank with the two ends capable of constituting similar but oppositely arranged cutting tools so that a right hand cutting tool and a left hand cutting tool will be provided by the same blank.

A further object of the invention is to provide a tool blank which will form a cutting tool having a "chip breaker" groove, which groove will not have to be reformed with the sharpening or regrinding of the tool, but which groove will be retained in the desired form during the entire life of the blank.

Another object of the invention is to provide a tool blank and cutting tool which can be mounted and used in regular standard type tool holders on conventional lathes and shapers and thus used in replacement of the conventional cutting tools heretofore employed.

The manner in which the above mentioned objects are achieved, the form in which my improved tool blank is prefabricated and the manner in which the resulting tool is ground and utilized and resharpened, will be briefly described with reference to the accompanying drawings, in which:

Fig. 4 is a similar perspective end view of the same blank after the grinding has taken place, thus showing the blank formed into the desired cutting tool. The broken lines in this figure indicate the further grinding which would take place when it becomes necessary to resharpen the tool;

Fig. 5 is a fragmentary elevation illustrating the resulting cutting tool of Fig. 4 employed in the common operation of cutting a shoulder on a shaft;

Fig. 6 is a similar fragmentary elevation illustrating how the opposite end of the same blank, when similarly ground, forms a similar tool adapted for cutting in the opposite direction;

Fig. 7 is a perspective view of a slightly modified blank made in accordance with my invention;

Fig. 8 is an end view of the blank of Fig. 7 before the grinding of the end of the same has occurred to form the desired cutting tool.

Figure 2:
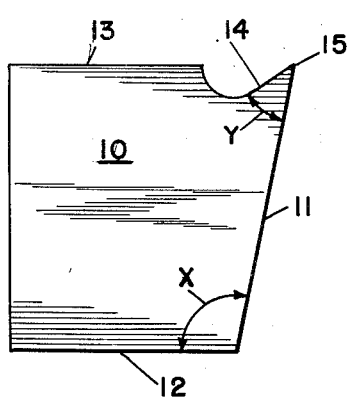
Fig. 2 is an end elevation of the same blank drawn to a larger scale.
Figure 1:
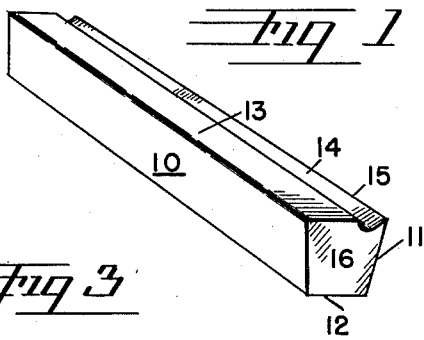
Fig. 1 is a perspective view of a cutting tool blank, prefabricated in accordance with my invention, this view showing the blank before any grinding of the blank to form the cutting tool has taken place.
Figure 3:
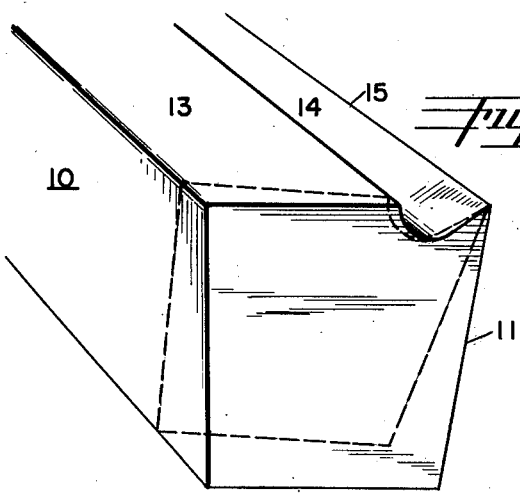
Fig. 3 is an enlarged perspective view of the near side of the end of the blank, showing in broken line the grinding pattern which would be followed to produce a preferred type of cutting tool.

Referring first to Figs. 1, 2 and 3, the blank, which is indicated in general by the reference character 10, comprises a bar, of uniform cross section throughout its entire extent, made of special steel of desired hardness for cutting tools. The blank 10, however, instead of being rectangular or square in cross section, as has heretofore been customary with tool forming bars or blanks of this general type, has one side wall or face 11 sloping outwardly and upwardly and thus forming an obtuse angle with the adjacent or bottom wall 12 (namely the angle $x$ of Fig. 2).

The top face or wall 13, when the blank is made in the form shown in Figs. 1, 2 and 3 is formed with a groove 14 sloping downwardly and inwardly from the upper edge 15 of the wall 11, and this groove 14 extends for the entire length of the blank 10. The bottom of this groove forms a sharp angle along the edge 15 with the wall 11 (this angle being indicated at $y$ in Fig. 2). As will be readily recognized and understood, the edge 15 becomes the cutting edge of the resulting tool.

The end faces of the blank 10, one such end face being shown at 16 in Fig. 1, will presumably be substantially perpendicular to the various side walls when the blank is first made. Therefore, in order to complete the making of one end of the blank into the preferred cutting tool, for example at the near side as shown in Figs. 1 and 3, the end face is beveled or ground until it is slightly oblique to the various side walls and, in particular to the cutting edge 15. When thus beveled or ground it will lie in some such plane as indicated by the broken lines in Fig. 3. Such beveled end of the finished tool portion of the blank is shown at 17 in Fig. 4. The cutting edge 15 extends to the furthest point on the tip resulting from the beveling or grinding of this end of the blank. The other end of the blank is also ground correspondingly though oppositely and the cutting tool is then complete.

Fig. 5 illustrates how the resulting cutting tool, formed at the end of the blank shown in Fig. 4 is employed in the usual manner, for example in cutting a shoulder 18 on a rotated shaft, the shaft of course being rotated in the direction indicated by the arrow. Thus the end portion of the cutting edge 15, or the tip which has been formed at the end of the blank, serves as the cutting edge of the tool. The necessity for having the end face 17 of the cutting tool extending in a plane which is not perpendicular to the cutting edge 15 when such a shoulder is to be cut, will be apparent from Fig. 5, since the only contact between the tool and the shaft or element being cut must be at the cutting edge 15.

When the end portion of the cutting edge 15, which performs the cutting operation as illustrated in Fig. 5, becomes worn to the extent that the cutter requires resharpening, such resharpening of the tool is accomplished merely by grinding away the end face 17 in parallelism with the bevel established until, for example, the new end face lies in the plane indicated by the broken lines in Fig. 4. When this has been done a new unused portion of the edge 15 then becomes the cutting edge of the resharpened tool. Thus for resharpening the tool all that is required is to grind a single or end face of the tool, such grinding taking place in only a single plane. As is well known, heretofore the sharpening of similar cutting tools, whether specially shaped or formed from a blank of customary rectangular cross section, has always required careful grinding of two or three faces.

The groove 14 serves two purposes. It provides the equivalent of the familiar "chip breaker" groove for the end of the cutter in serving to prevent the formation of long spiral coils from the shavings cut by the cutter tool; and it enables the two intersecting planes which form the cutting edge 15 to intersect at a desirable sharp angle (thus the angle marked $y$ in Fig. 2). This angle along the cutting edge, which determines the so-called "rake angle" of the cutting tool, as is well known, should be different for the cutting of different materials. For example, this angle along the cutting edge should be sharper in a tool to be used for cutting aluminum and copper than in a tool for cutting cast iron. Consequently when prefabricating the blank 10 in accordance with this form of my invention, the depth and slope of the bottom of the groove 14 will be governed by the materials for the cutting of which it is expected that the resulting cutter will be used.

Heretofore when "chip breaker" grooves have been provided in cutting tools, these grooves have extended for only a short distance at the cutting end, and consequently only a limited amount of resharpening of the tool has been possible within the limits of the "chip breaker" groove. With my improved prefabricated blank, made in the form illustrated in Fig. 1, the "chip breaker" groove will be maintained regardless of the number of resharpenings of the tool, and furthermore, as will be apparent, the tool can be resharpened repeatedly until a very substantial portion of the entire length of the blank has been consumed.

Thus far I have described the sharpening and use of the resulting tool formed at one end of the blank only. However, as previously indicated, the opposite end is capable of similar sharpening and the opposite end is similarly beveled to make the tool complete. The opposite end then becomes a tool for an opposite cutting operation. Such a cutting operation is illustrated in Fig. 6 in which the shoulder 19 is being cut on the shaft, the shaft being rotated in the direction indicated by the arrow. To make this cutter, the opposite end of the same blank has been beveled or ground to present a face 20 corresponding to the other end face 17 shown in Fig. 5, but with the end face 20 sloping oppositely with respect to the edges of the blank or bar from the end face 17. Here again the resharpening of this oppositely-formed tool is an equally simple matter, and such resharpening may be repeated many times until a substantial portion of the entire blank has been consumed. The "chip breaker" groove will be constantly maintained at either end regardless of the number of times either end tool is resharpened.

Figure 9:
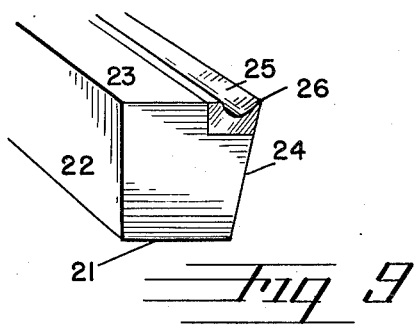
Fig. 9 is a perspective view of another blank illustrating an additional modified manner in which my invention may be carried out.

In the modified form of my tool blank shown in Fig. 9 the overall shape of the blank is not changed. Thus the side wall 22 is perpendicular to the bottom wall 21, the side wall 24 is oblique to the bottom wall 21, and the top wall 23 is parallel to the bottom wall 21. However, in this modified form of the blank the portion of the blank in which the longitudinal groove 25 and the cutting edge 26 are provided consists of an inlay which is secured to the remaining body portion of the blank by brazing or by any other suitable method. With this construction only the inlay portion need be made of special hard metal required for a cutting tool and the remaining body portion of the blank can be of ordinary steel and thus of softer metal than the cutting edge. In all other respects the blank of Fig. 9 is similar to the blank 10 of Fig. 1. The sharpening of both ends of the blank is performed in the same manner.

It is of course not absolutely necessary that the groove 14 of the blank of Figs. 1 to 4 inclusive, or the groove 25 of the blank of Fig. 9, should extend throughout the entire length of the blank. For instance the groove might be discontinued for a short distance near the longitudinal center of the blank inasmuch as the blank will never be completely consumed. It is however necessary in the proper carrying out of my invention, if the "chip breaker" groove is desired, that the groove should extend for the major portion of the blank. Thus if a right and left cutting tool is to be made with a grooved blank in accordance with my invention the groove must extend inwardly from each end for as great a distance as the cutting edge can be utilized with repeated resharpenings. Generally it will be more practical to have the groove therefore continue throughout the entire length of the blank.

Another modified form in which my prefabricated tool blank may be made is illustrated in Figs. 7 and 8. In this modification no two sides of the blank or bar are parallel and the cross section of the blank assumes the shape of a trapezium. The blank shown in Figs. 7 and 8 has the same cross section throughout its extent and preferably is formed with two walls, thus the side wall 30 and bottom wall 31 which are perpendicular to each other, with a side wall 32 sloping obliquely upwardly from the bottom wall 31 and with a top wall 33 sloping obliquely upwardly from the top of wall 30. The two oblique walls 32 and 33 will intersect to form the cutting edge 34. The angularity between these two walls or faces 32 and 33 may of course be varied but must in any event be less than 90° in order to form a proper cutting edge.

The difference between the blank of Figs. 7 and 8 and the blank of Figs. 1 and 9 is that the longitudinal groove is omitted and consequently the resulting cutting tool at either end of this modified blank will be without a "chip breaker" groove. This blank is therefore suitable for providing a cutting tool for use when a "chip breaker" groove in the cutting tool is not necessary. The grinding or sharpening of each end of this modified blank of Figs. 7 and 8 is performed in exactly the same manner as in the case of the blanks of Figs. 1 and 9.

Thus in any of the illustrated forms in which my invention may be carried out, the sharpening and resharpening of the resulting cutting tool requires the grinding of only one face at the corresponding end of the bar or blank. A similar but oppositely arranged cutting tool is available at each end of the blank, and resharpening of either tool or of either end of the blank may be repeated until a large portion of the blank has been consumed.

I claim:

1. A cutting bit consisting of an elongated bar of uniform cross section throughout its entire length, said bar having parallel top and bottom faces, one side face perpendicular to said top and bottom faces and the other side face extending upwardly and outwardly and forming an obtuse angle with said bottom face, a narrow longitudinal groove in said top face extending along the edge between said top face and said latter mentioned other side face, said groove extending the entire length of said bar, the width of said groove being considerably less than one-half the width of said top face, the outer portion of the bottom of said groove sloping upwardly and outwardly so as to form a sharp edge with the top of said other side face, whereby, when either end of said bar is beveled so as to cause said edge to extend to the furthest point on said end, that end will present a cutting tip with said edge constituting the cutting edge and said groove also acting as a chip breaker.

2. A right and left cutting bit consisting of an elongated bar of uniform cross section throughout its entire length, said bar having parallel top and bottom faces, one side face perpendicular to said top and bottom faces and the other side face extending upwardly and outwardly and forming an angle of approximately 97° with said bottom face, a narrow longitudinal groove in said top face extending along the edge between said top face and said latter mentioned other side face, said groove extending the entire length of said bar, the width of said groove being considerably less than one-half the width of said top face, the outer portion of the bottom of said groove sloping upwardly and outwardly so as to form a sharp edge with the top of said other side face, said edge extending in the same plane as said top face, whereby, when both ends of said bar are beveled so as to cause said edge to extend to the furthest point on the respective end, said ends will present right and left cutting tips with said edge constituting the cutting edge and said groove also acting as a chip breaker.

WHITNEY VREELAND.

References Cited in the file of this patent

UNITED STATES PATENTS

| Number | Name | Date |
| --- | --- | --- |
| 2,424,473 | Luers | July 22, 1947 |
| 2,527,978 | Wood | Oct. 31, 1950 |

FOREIGN PATENTS

| Number | Country | Date |
| --- | --- | --- |
| 16,879 | Great Britain | July 23, 1907 |
| 23,699 | Great Britain | Oct. 14, 1897 |
| 138,141 | Great Britain | Feb. 5, 1920 |
| 227,494 | Great Britain | Jan. 5, 1925 |
| 247,958 | Great Britain | Aug. 12, 1926 |